T. L. LEE.
BRUSH MOUNTING FOR ELECTRIC MOTORS OR GENERATORS.
APPLICATION FILED APR. 10, 1916.

1,240,585. Patented Sept. 18, 1917.

Inventor:
Thomas L. Lee
by his attorney
Farnum F. Dorsey

UNITED STATES PATENT OFFICE.

THOMAS L. LEE, OF ROCHESTER, NEW YORK, ASSIGNOR TO NORTH EAST ELECTRIC COMPANY, OF ROCHESTER, NEW YORK, A CORPORATION OF NEW YORK.

BRUSH-MOUNTING FOR ELECTRIC MOTORS OR GENERATORS.

1,240,585.     Specification of Letters Patent.     Patented Sept. 18, 1917.

Application filed April 10, 1916. Serial No. 90,205.

*To all whom it may concern:*

Be it known that I, THOMAS L. LEE, a citizen of the United States, residing at Rochester, in the county of Monroe and State of New York, have invented certain new and useful Improvements in Brush-Mountings for Electric Motors or Generators; and I do hereby declare the following to be a full, clear, and exact description of the invention, such as will enable others skilled in the art to which it appertains to make and use the same.

This invention relates to brush-mountings adapted particularly for use in an electric motor or generator of the inclosed type.

One object of the invention is to produce brush-mountings of simple and inexpensive, but strong and reliable, construction, and particularly mountings in which the number of parts is a minimum and in which the various parts are held in their operative relation by a minimum number of fastening-devices. To this end I employ a construction in which stud-bolts are used as pivotal supports for the swinging brush-holders, and in which these stud-bolts serve also as means for fixing in place the stop-members and other devices by which the movements of the brush-holders, and of other parts connected therewith, are controlled.

Another object of the invention is to produce a brush-mounting adapted particularly for use in connection with an adjustably supported brush such, for example, as the third brush in a three-brush motor or generator. To this end I employ the stud bolts hereinbefore referred to as the means for fixing in operative position resilient retaining-devices which coöperate, in the manner hereinafter described, with a rotatable ring supporting the third brush-holder.

Figure 1:
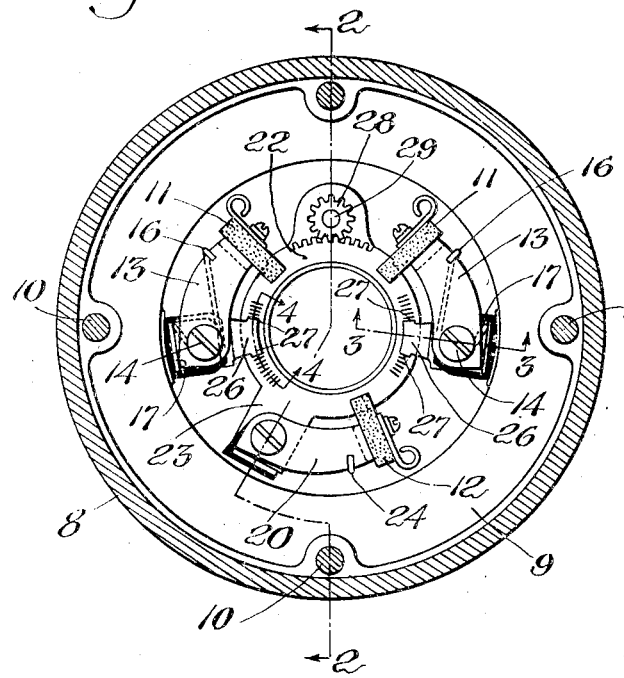
Figure 2:
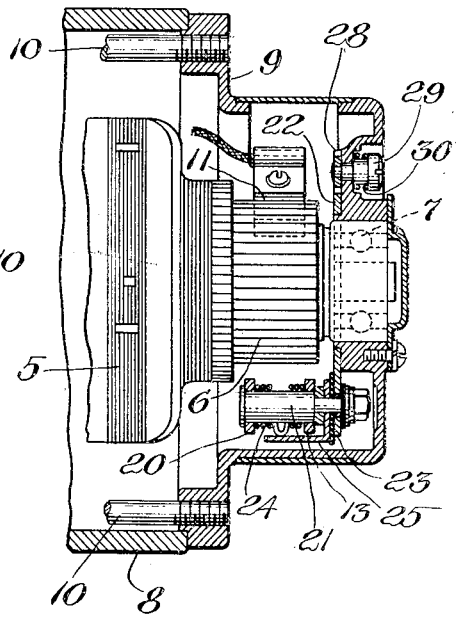
Figure 3:
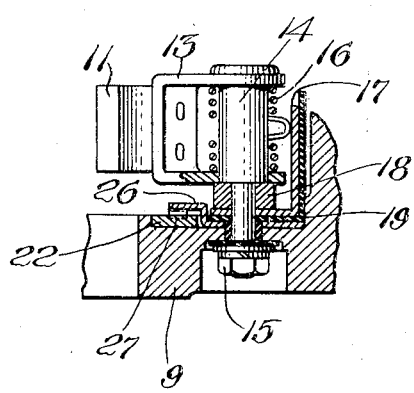
Figure 4:
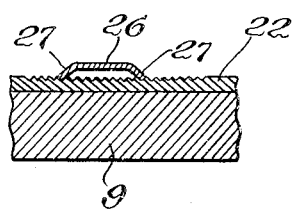

In the accompanying drawings Figure 1 is an elevation of a portion of an electric motor or generator provided with brush-mountings embodying the present invention, this portion including the brushes, the brush-mountings, and the head of the combined frame and casing in which these parts are inclosed, looking toward the inner surface of the head; Fig. 2 is a section on the line 2—2 in Fig. 1, showing also the armature, commutator, and armature-bearing in side-elevation; Fig. 3 is a section on the line 3—3 in Fig. 1, but on a larger scale than the latter figure; and Fig. 4 is a section on the line 4—4 in Fig. 1, but on a larger scale.

The invention is illustrated as embodied in an electric motor or generator of the well known inclosed four-pole type with third-brush regulation. The armature 5 and commutator 6 are of any ordinary or suitable form, and the armature-shaft is mounted in ball-bearings. The armature is inclosed within a cylindrical body 8 forming the field-ring of the machine, and the end of this ring is closed by a head 9 secured in place by through-bolts 10. The head 9 is extended cylindrically to afford a support for the outer race of one of the ball-bearings 7, and also to provide a housing for the commutator and the brushes of the machine.

The brushes comprise two main brushes 11 and a regulating brush 12, which may be connected and used in the well known manner of a three-brush machine. The brushes 11 are mounted on brush-holders 13 which are U-shaped in longitudinal section, each brush being fixed to the transverse middle portion of the brush-holder, and the brush-holders are pivoted, at the ends of their lateral members, upon stud-bolts 14. Each stud-bolt is fixed in place on the head 9 by means of a nut 15, but is insulated from the head by washers and a bushing of insulating material, as shown in Fig. 3.

The brushes are held in engagement with the commutator by means of hairpin-springs 16, which are coiled about the stud-bolts and are connected, at their ends, with the side-members of the brush-holders.

To provide an anchorage for the middle portion of each spring 16, and also a stop to limit the swinging movement of the corresponding brush-holder, a stop-plate 17 of rigid sheet-metal is fixed in place by each stud-bolt, as shown particularly in Fig. 3, this stop-plate having a part which is clamped between the collar 18 on the stud-bolt and a sheet of insulating material 19 which is interposed between the collar and the head 9. The stop-plate 17 is bent at a right angle so as to have a part which extends inwardly between the cylindrical wall of the head and the extremity of the brush-holder. As shown in Fig. 1, this portion of the stop-plate will be engaged by the adjacent edge of one of the side-members of the brush-holder 13 at either extreme of its swinging movement upon the stud-bolt 14. As shown particularly in Fig. 3, the stop-plate 17 serves also as an abutment for the middle portion of the hairpin-spring 16. The insulating material 19 is also bent at a right angle and extended inwardly, so as to be interposed between the stop-plate and the head 9 and, by direct engagement with the latter, to support the stop-plate against the pressure of the spring and the brush-holder.

The third brush 12 is mounted on a brush-holder 20, similar to the brush-holders 13, and this brush-holder 20 is pivoted on a stud-bolt 21. To permit adjustment of the third brush, the bolt 21 is fixed in a projection 23 from a flat annular member or ring 22, and this ring rests on an annular seat formed in the inner surface of the head 9. The brush-holder is controlled by a hairpin-spring 24 similar to the spring 16, and this spring is anchored against a stop-plate 25 which is fixed, by the stud-bolt 21, against the part 23, as shown in Fig. 2, insulating material being interposed between the bolt and the stop-plate and the part 23. The stop-plate 25 also serves to limit the swinging movement of the brush-holder 20 in the same manner as in the construction shown in connection with the brush-holders 13.

In order to retain the ring 22 upon its seat, and also to hold the ring in any adjusted position to which it may be set, two retainers 26 are employed, in the form of resilient pieces of sheet-metal, these retainers being fixed in place by the stud-bolts 14 as shown in Fig. 3, and having ends which overhang the ring 22. These ends are provided with oppositely extending extremities 27, which bear against the surface of the ring and thus press the ring against its seat. The surface so engaged is corrugated, as shown in Fig. 4, so that the extremities 27, by seating in the corrugations, prevent accidental rotation of the ring 22, while they will yield to a sufficient force when adjustment of the third brush is necessary.

As a convenient means for producing an adjusting movement of the ring 22 this ring is provided with gear-teeth upon a portion of its periphery, as shown in Fig. 1, and these teeth are engaged by a pinion 28 which is fixed on the inner end of a stud 29. This stud is journaled in the head 9 and extends to the exterior thereof, being provided with a slotted head, so that it may be turned by means of a screw-driver. A spring 30, interposed between the head 9 and the slotted head of the stud, prevents looseness of the stud in its bearing.

It will be apparent that the construction illustrated and described is one which may be inexpensively manufactured, since it consists almost entirely of turned parts and presswork. It will also be apparent that the construction is such as to greatly facilitate the assembling of the mechanism or taking it apart when repair or replacement is necessary, since the entire brush-mounting may be removed from the head 9 upon merely removing the two nuts 15, while the parts may be as readily replaced and secured in operative position.

I claim:

1. In an electric motor or generator, the combination, with a flat frame-member, of a stud-bolt fixed in and extending normal to the frame-member; a brush-holder pivotally mounted on the stud-bolt; a spring for rocking the brush-holder; and a sheet-metal stop-plate having two parts at a right-angle to each other, one of said parts being perforated to receive the stud-bolt and being fixed, by the stud-bolt, against the frame-member, but insulated therefrom, and the other of said parts extending alongside the part of the stud-bolt on which the brush-holder is mounted, in position to coöperate with the brush-holder to limit the movement thereof about the stud-bolt in both directions.

2. In an electric motor or generator, the combination, with a frame-member provided with an annular bearing, of a ring mounted to turn on said bearing; a brush-holder carried by the ring; and a resilient member frictionally engaging the ring and pressing it against the bearing so as both to hold the ring thereon and retain it normally against turning movement.

3. In an electric motor or generator, the combination of a frame-member provided with an internal annular bearing; a ring mounted to turn on said bearing and provided with gear-teeth; a pinion engaging said teeth; a rotary member, for turning the pinion, extending through the frame-member and accessible from outside; a resilient member engaging the ring and holding it frictionally against the bearing; and a brush-holder mounted on the ring.

4. In an electric motor or generator, the combination of a frame-member provided with an annular bearing; a ring mounted to turn on said bearing; a brush-holder carried by the ring; a stud-bolt fixed in said frame-member; a brush-holder pivoted on the stud-bolt; and a resilient retaining-member fixed by the stud-bolt to the frame-member and frictionally engaging said ring to resist rotation thereof.

5. In an electric motor or generator, the combination of a frame-member; an adjustable brush-supporting member mounted thereon; a stud-bolt fixed in the frame-member; a brush-holder pivoted on the stud-bolt; a stop-member fixed by the stud-bolt to the frame-member and coöperating with the brush-holder; and a resilient retaining-member also fixed by the stud-bolt to the frame-member and coöperating with said adjustable brush-supporting member.

THOMAS L. LEE.